United States Patent [19]

Oudelaar

[11] 4,452,328

[45] Jun. 5, 1984

[54] CABTILT SYSTEM WITH SYNCHRONIZING VALVE

[75] Inventor: Tone Oudelaar, Oldenzaal, Netherlands

[73] Assignee: Applied Power Inc., Milwaukee, Wis.

[21] Appl. No.: 323,373

[22] Filed: Nov. 20, 1981

[51] Int. Cl.³ ............................................. B62D 23/00
[52] U.S. Cl. .................................. 180/89.14; 91/171; 180/89.15; 296/190
[58] Field of Search ............... 180/89.13, 89.14, 89.15, 180/89.16; 296/190, 35.1; 91/171, 512

[56] References Cited

U.S. PATENT DOCUMENTS

| 2,343,167 | 2/1944 | Bench | 91/171 |
| 3,364,820 | 1/1968 | Stockwell | 91/171 |
| 3,472,547 | 10/1969 | London | 296/190 |
| 3,677,137 | 7/1972 | Stockwell | 91/171 |
| 3,769,881 | 11/1973 | Aoki | 91/171 |
| 4,099,379 | 7/1978 | Budzich | 91/512 |
| 4,157,066 | 6/1979 | Pretty | 91/171 |
| 4,174,016 | 11/1979 | Levington | 180/89.15 |

Primary Examiner—Bruce H. Stoner, Jr.
Assistant Examiner—John A. Carroll
Attorney, Agent, or Firm—John J. Byrne; Bradford E. Kile; Kevin M. O'Brien

[57] ABSTRACT

Disclosed is a cabtilt system comprising conventional hydraulic tilting cylinders, a cock sensing member, and a synchronizing valve which causes one of the hydraulic tilting cylinders to slow or stop its motion until the other cylinder catches up with it if the cock sensing member senses that the cab is cocking as it tilts.

8 Claims, 7 Drawing Figures

CABTILT SYSTEM WITH SYNCHRONIZING VALVE

TECHNICAL FIELD

This invention relates to systems for tilting truck cabs relative to the truck frame to expose the truck motor for maintenance. In particular, it relates to such systems in which means are provided to prevent or minimize the cocking of the truck cab as it pivots relative to the cab frame.

BACKGROUND OF THE PRIOR ART

Tiltable truck cabs, particularly those which are fully suspended relative to the truck frames, have a tendency to cock (that is, to swing "out of true") during tilting because of uneven loading on the tilt cylinders as a result of uneven cab weight distribution. To cure this defect, an anti-roll bar (also called a torsion bar) is usually fitted between the left- and right-hand pivots. However, such anti-roll bars interfere with the desirable spring rates of the cab in their over-the-road position.

OBJECT OF THE INVENTION

It is, therefore, a general object of the invention to prevent or minimize cocking of truck cabs during tilting without interfering with the spring rates of the truck cab.

It is a further object of the invention to provide a device which will accomplish the foregoing result which is inexpensive to manufacture, sturdy, and not given to malfunction.

Other objects and advantages of the invention will become apparent from the description of a preferred embodiment thereof given hereinafter.

BRIEF SUMMARY OF THE INVENTION

The invention comprises a synchronizing valve for a dual cylinder hydraulic cabtilt system. The synchronizing valve closes off the hydraulic fluid to one of the tilt cylinders when that cylinder extends or retracts more rapidly than the other cylinder.

The invention also comprises cock sensing apparatus attached to the cab and to the synchronizing valve in such a way that the cocking of the cab transmits a mechanical signal to the synchronizing valve, thereby closing off the fluid to the quicker tilt cylinder.

DETAILED DESCRIPTION OF A PREFERRED EMBODIMENT OF THE INVENTION

Broadly speaking, the invention comprises three separate sub-systems: the synchronizing valve per se, the cabtilt system, and the cock sensing means. While they are described together and are preferably used together, it will be appreciated that the synchronizing valve described herein could be used with a different cock sensing means (for instance, an electronic cock sensing means which transmits an electronic signal to an electrical drive means for the spool of the synchronizing valve) and that the cock sensing means described herein could be used with a different synchronizing valve.

STRUCTURE OF THE SYNCHRONIZING VALVE

Figure 6:
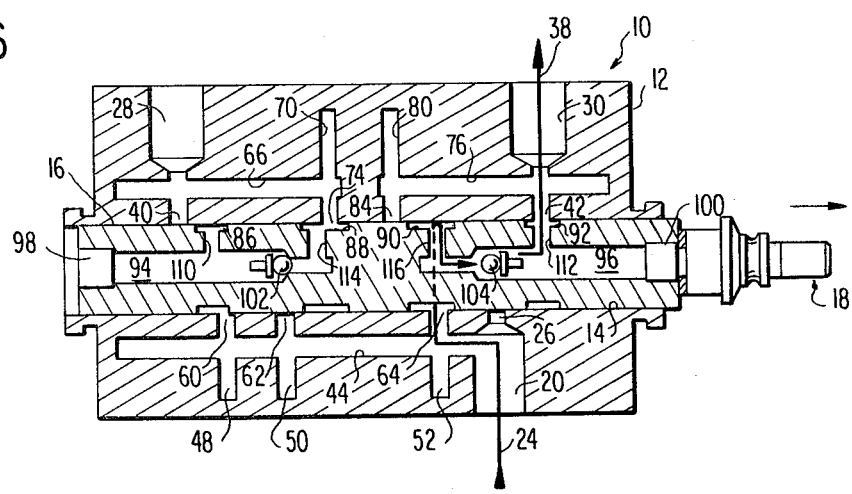
FIG. 6 is a simplified view of the synchronizing valve with the valve spool moved to the right, showing the hydraulic path for extending one of the tilt cylinders.
Figure 7:
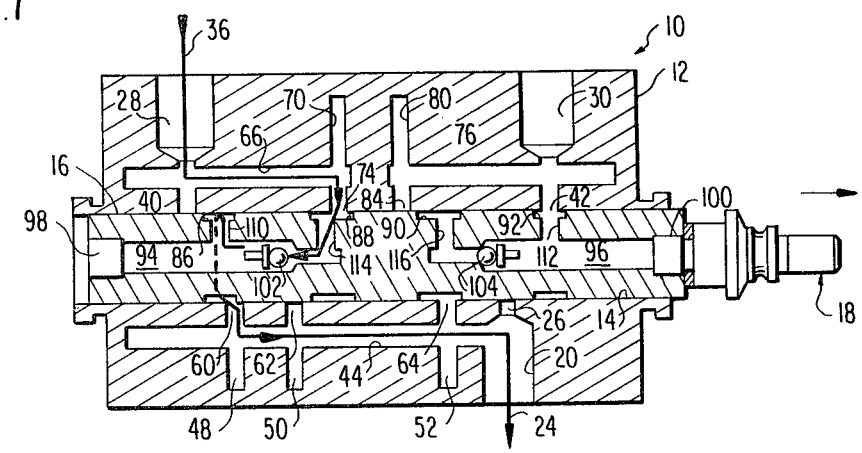
FIG. 7 is a simplified view of the synchronizing valve with the valve spool moved to the right, showing the hydraulic path for retracting one of the tilt cylinders.

The synchronizing valve 10 comprises a housing 12 having a through bore 14 in which a spool 16 is slidably received. The spool 16 can be moved from a middle position (shown in FIG. 5) either to the right (as shown in FIGS. 6 and 7) or to the left (not shown) by means 18 (described hereinafter).

One side of the housing 12 contains a stepped transverse bore 20 which is threaded at 22 for connection to fluid conduit 24 and which communicates with the bore 14 at 26. The other side of the housing 12 contains stepped transverse bores 28 and 30, which are threaded at 32 and 34, for connection to fluid conduits 36 and 38, respectively, and which communicate with the bore 14 at 40 and 42, respectively.

The bore 20 communicates with a longitudinal bore 44 which is plugged at 46, and the bore 44 in turn communicates with three transverse bores 48, 50, and 52, which are plugged at 54, 56, and 58 and which communicate with the bore 14 at 60, 62, and 64, respectively. The bore 28 communicates with a longitudinal bore 66 which is plugged at 68, and the bore 66 in turn communicates with a transverse bore 70, which is plugged at 72 and which communicates with the bore 14 at 74. The bore 30 communicates with a longitudinal bore 76 which is plugged at 78, and the bore 76 in turn communicates with a transverse bore 80, which is plugged at 82 and which communicates with the bore 14 at 84.

The spool 16 contains spaced annular reliefs 86, 88, 90, and 92 and longitudinal, stepped end bores 94 and 96. The bores 94 and 96 are plugged at 98 and 100, respectively, and contain one-way valves 102 and 104 which are biased to their closed positions by springs 106 and 108, respectively. Transverse bores 110 and 112 lead from the bores 94 and 96 downstream of the one-way valves 102 and 104 to the annular reliefs 86 and 92, respectively, and transverse bores 114 and 116 lead from the bores 94 and 96 upstream of the one-way valves 102 and 104 to the annular reliefs 88 and 90, respectively. O-rings 118 and 120 are provided to prevent longitudinal loss of working fluid.

OPERATION OF THE SYNCHRONIZING VALVE

Figure 5:
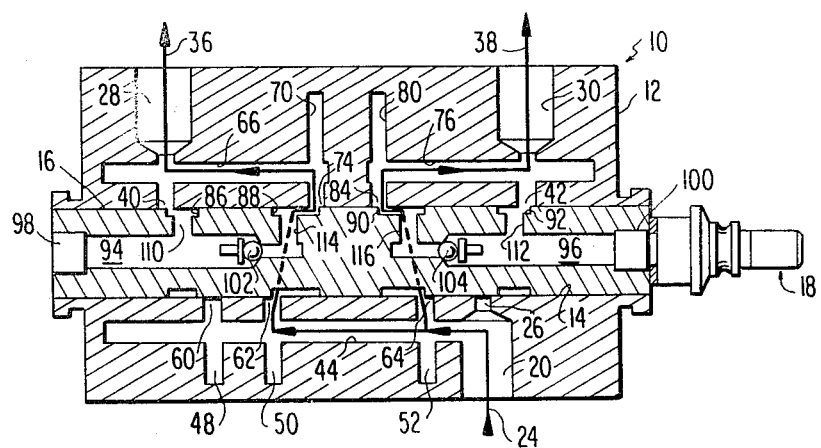
FIG. 5 is a simplified view of the synchronizing valve in its central position, showing the hydraulic path for extending both of the tilt cylinders.

When the synchronizing valve 10 is in the middle position, shown in FIG. 5, working fluid can be pumped through the fluid conduit 24, the bore 20, the bore 44, the bores 50 and 52, the annular reliefs 88 and 90, the bores 70 and 80, the bores 66 and 76, and the bores 28 and 30 to the fluid conduits 36 and 38 in approximately equal proportion. The one-way valves 102 and 104 remain closed because the same pressure is communicated to the downstream sides of each valve via the bores 28 and 30, the annular reliefs 86 and 92, the bores 110 and 112, and the bores 94 and 96 respectively, and to the upstream sides of each valve via the annular reliefs 88 and 90 and the bores 114 and 116, respectively.

With the synchronizing valve 10 in the middle position, shown in FIG. 5, working fluid can be pumped through the fluid conduits 36 and 38 to the fluid conduit 24 by a path which is just the reverse of the path previously described. Again, the one-way valves 102 and 104 remain closed because the same pressure is communicated to both sides of each valve.

When the synchronizing valve 10 has been moved all the way to the right, as shown in FIG. 6, working fluid can be pumped through the fluid conduit 24, the bore 20, the bore 44, the bore 52, the annular relief 90, the bore 116, the bore 96, the bore 112, the annular relief 92, and the bore 30 to the fluid conduit 38. The one-way valve 104 in the bore 96 is unseated by the pressure of the working fluid on its upstream side, which is no longer balanced by pressure on its downstream side because the annular relief 90 has moved out of registry with the bore 80. Similarly, no working fluid is communicated to the fluid conduit 36 because the annular relief 88 has moved out of registry with the bore 50. While working fluid is transmitted to the downstream side of the one-way valve 102 via the bore 44, the bore 48, the annular relief 86, the bore 110, and the bore 94, it only serves to reinforce the closure of the one-way valve. Of course, if the synchronizing valve 10 is moved part of the way to the right rather than all the way to the right, the flow of working fluid to the fluid conduit 36 is correspondingly reduced rather than halted altogether.

Although not illustrated, when the synchronizing valve 10 has been moved to the left, working fluid can be pumped through the fluid conduit 24 to the fluid conduit 36 by a path which is the mirror image of the path illustrated in FIG. 6.

When the synchronizing valve 10 has been moved to the right, as shown in FIG. 7, working fluid can be pumped through the fluid conduit 36, the bore 28, the bore 66, the bore 70, the annular relief 88, the bore 114, the bore 94, the bore 110, the annular relief 86, the bore 48, the bore 44, and the bore 20 to the fluid conduit 24. The one-way valve 102 in the bore 94 is unseated by the pressure of the working fluid on its upstream side, which is no longer balanced by pressure on its downstream side because the annular relief 86 has moved out of registry with the bore 28. Similarly, no working fluid can be pumped from the fluid conduit 38 to the fluid conduit 24 because the annular relief 90 has moved out of registry with the bore 80. While working fluid is transmitted to the upstream side of the one-way valve 104 via the bore 44, the bore 52, the annular relief 90, the bore 116, and the bore 96, it is balanced by working fluid transmitted to the downstream side of the one-way valve 104 via the fluid conduit 38, the bore 30, the annular relief 92, the bore 112, and the bore 96. Again, if the synchronizing valve 10 is moved part of the way to the left rather than all the way to the left, the flow of the working fluid to the fluid conduit 38 is correspondingly reduced rather than halted altogether.

Although not illustrated, when the synchronizing valve 10 has been moved to the left, working fluid can be pumped through the fluid conduit 38 to the fluid conduit 24 by a path which is the mirror image of the path illustrated in FIG. 7.

STRUCTURE OF THE CABTILT SYSTEM

Figure 4:
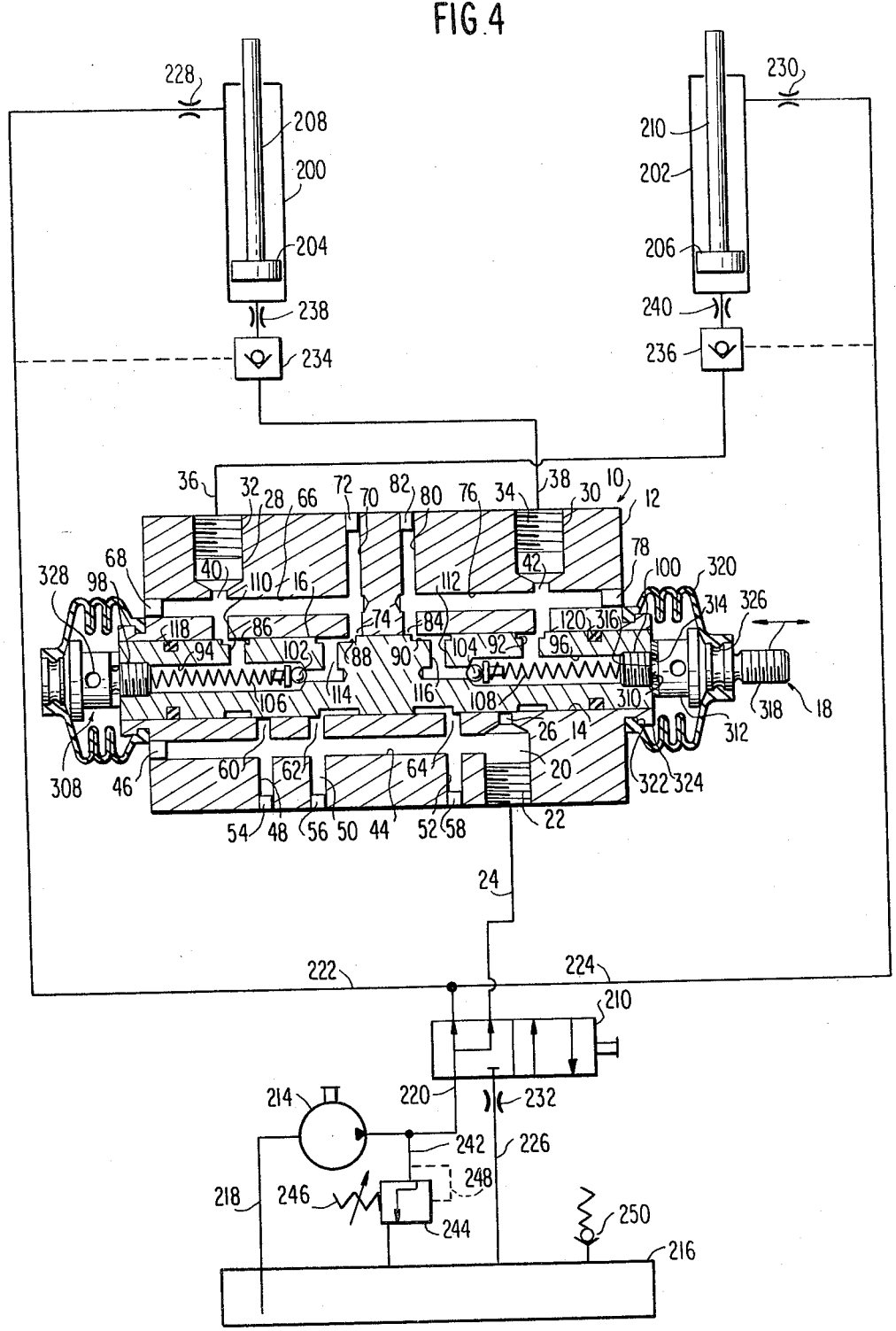
FIG. 4 is a partially schematic view of the synchronizing valve, the hydraulic circuitry, and the tilt cylinders.

As shown in FIG. 4, the cabtilt system comprises left and right hydraulic cylinders 200 and 202 containing pistons 204 and 206 and rods 208 and 210, respectively, the synchronizing valve 10, the cock sensing means 18, a control valve 210, a pump 214, and a reservoir 216. The intake side of the pump 214 is connected to the reservoir 216 by a fluid conduit 218, and the output side of the pump 214 is connected to the control valve 210 by a fluid conduit 220. The control valve 210 is connected to the synchronizing valve 10 by fluid conduit 24, to the pull sides of the hydraulic cylinders 200 and 202 by fluid conduits 222 and 224, respectively, and to the reservoir 216 by fluid conduit 226. The fluid conduits 222 and 224 contain restrictions 228 and 230, respectively, and the fluid conduit 226 contains a restriction 232. The bores 28 and 30 in the synchronizing valve 10 are connected to the pull sides of the hydraulic cylinders 200 and 202 by the fluid conduits 36 and 38, respectively. The fluid conduits 36 and 38 contain one-way valves 234 and 236 and restrictions 238 and 240, respectively.

A fluid conduit 242 containing a bypass valve 244 permits hydraulic fluid from the conduit 220 to return directly to the reservoir 216 when the pressure in the conduit 220 exceeds a predetermined minimum value. The bypass valve 244 is normally biased shut by a spring 246, but pressure in the conduit 242 acting through a pressure tap 248 moves the bypass valve 244 to the left in FIG. 4 against the spring 246, ultimately allowing the hydraulic fluid to return to tank through the conduit 242.

A spring biased valve 250 is provided to vent gaseous overpressures in the reservoir 216 above the hydraulic fluid.

Figure 1:
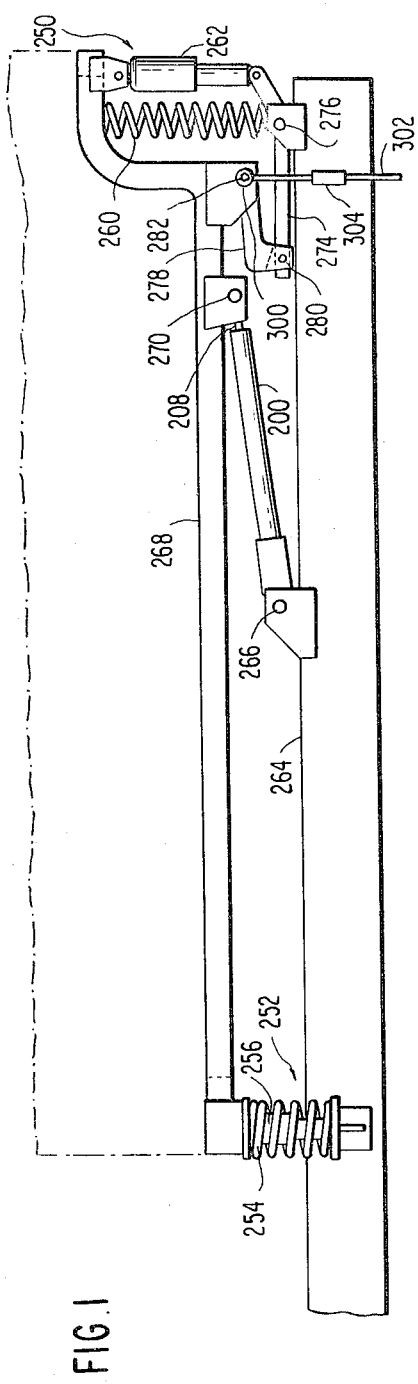
FIG. 1 is a fragmentary side view of a cab frame, a truck frame, and one of the tilting cylinders.

Turning to FIG. 1, it will be seen that the cabtilt system also comprises releasable rear cab suspension units 252 each of which comprises a coil spring 254 and a hydraulic damper 256 and front cab suspension units 258 each of which comprises a coil spring 260 and a shock absorber 262. In practice, cab latch mechanisms would be provided adjacent the rear cab suspension units 252, but they are not shown because they do not relate directly to the subject invention.

The hydraulic cylinders 200 and 202 are connected to the truck frame 264 for pivotal movement about axis 266 and to the cab frame 268 for pivotal movement about axes 270. The cab frame 268 is connected to the truck frame 264 by a yoke arrangement 272 comprising generally horizontal arms 274 pivoted on the truck frame 264 at 276 and generally vertical arms 278 pivoted on the horizontal arms 274 at 280 and on the cab frame 268 at 282.

As will be appreciated, when the cab latch mechanisms are unlatched and hydraulic fluid is pumped through the conduits 36 and 38 to the push chambers of the hydraulic cylinders 200 and 202, extension of the rods 208 and 210 initially tries to push forward the cab frame 268. The cab frame 268 lifts on the coil springs 260 and the shock absorber 262 until the yoke arrangement 272 is opened up fully. The cab frame 268 then begins to tilt, pivoting around the axis 276. Thus, the arms 274 and 278 can be seen as trailing arms (or radius rods) holding the cab frame 268 in position while at the same time making up and down movement (springing) possible.

CABTILT SYSTEM OPERATION

When the control valve 210 is in its left-hand position and the spool 16 in the synchronizing valve 10 is in its middle position, as shown in FIG. 4, working fluid from the reservoir 216 is pumped through the fluid conduit 218, the pump 214, the fluid conduit 220, the control valve 210, the fluid conduit 24, the synchronizing valve 10, and the fluid conduits 36 and 38 to the push sides of the hydraulic cylinders 202 and 200, respectively, in approximately equal amounts. At the same time, working fluid from the reservoir 216 is pumped through the fluid conduit 218, the pump 214, the fluid conduit 220, the control valve 210, and the fluid conduits 222 and 224 to the pull sides of the hydraulic cylinders 200 and 202. However, the pulling force on the pistons 204 and 206 is less than the pushing force due to the presence of the rods 208 and 210 in the pull chambers, and the rods 208 and 216 accordingly extend. Since the incremental volume of the rods 208 and 210 exiting the hydraulic cylinders 200 and 202 exceeds the incremental volume of the push chambers in hydraulic cylinders 200 and 202 created by movement of the pistons 204 and 206, no working fluid has to be returned to the reservoir 216.

When the control valve 210 is in its right-hand position and the spool 16 in the synchronizing valve 10 is in its middle position, working fluid from the reservoir 216 is pumped through the fluid conduit 218, the pump 214, the fluid conduit 220, the control valve 210, and the fluid conduits 222 and 224 to the pull sides of the hydraulic cylinders 200 and 202. As the pistons 204 and 206 move downwardly in the hydraulic cylinders 200 and 202, working fluid exits the push chambers of the hydraulic cylinders 200 and 202 via the fluid conduits 38 and 36, respectively, the synchronizing valve 10, the fluid conduit 24, the control valve 210, and the fluid conduit 226 to the reservoir 216.

When the control valve 210 is in its left-hand position and the spool 16 in the synchronizing valve 10 has been moved to the right by the cock sensing means 18, working fluid from the reservoir 216 is pumped through the fluid conduit 218, the pump 214, the fluid conduit 220, the control valve 210, the fluid conduit 24, the synchronizing valve 10, and the fluid conduit 38 (but not the fluid conduit 36) to the push side of the hydraulic cylinder 200. Since no working fluid is pumped to the push side of the hydraulic cylinder 202, only the rod 208 advances until the cock sensing means 18 senses a restoration of equilibrium and brings the spool 16 back to its middle position. Working fluid is also simultaneously pumped to the pull chambers of the hydraulic cylinders 200 and 202, but, for the reason previously explained, that fluid does not cause downward movement of the pistons 204 and 206.

Similarly, when the control valve 210 is in its left-hand position and the spool 16 has been moved to the left by the cock sensing means 18, working fluid from the reservoir 216 is pumped through the fluid conduit 218, the pump 214, the fluid conduit 220, the control valve 210, the fluid conduit 24, the synchronizing valve 10, and the fluid conduit 36 (but not the fluid conduit 38) to the push side of the hydraulic cylinder 202. Since no working fluid is pumped to the push side of the hydraulic cylinder 200, only the rod 210 advances until the cock sensing means 18 senses a restoration of equilibrium and brings the spool 16 back to its middle position.

When the control valve 210 is in its right-hand position and the spool 16 has been moved to the right by the cock sensing means 18, working fluid which has been forced out of the push chamber of the hydraulic cylinder 202 by downward movement of the piston 206 flows through the fluid conduit 36, the synchronizing valve 10, the fluid conduit 24, the control valve 210, and the fluid conduit 226 to the reservoir 216. Working fluid from the push chamber of the hydraulic cylinder 200 cannot flow downwardly through the fluid conduit 38 because, as previously explained, its path is blocked internally of the synchronizing valve 10. Accordingly, only the rod 210 retracts until the cock sensing means 18 senses restoration of equilibrium and brings the spool 16 back to its middle position.

Similarly, when the control valve 210 is in its right-hand position and the spool 16 has been moved to the left by the cock sensing means 18, working fluid which has been forced out of the push chamber of the hydraulic cylinder 200 by downward movement of the piston 204 flows through the fluid conduit 38, the synchronizing valve 10, the fluid conduit 24, the control valve 210, and the fluid conduit 226 to the reservoir 216. Working fluid from the push chamber of the hydraulic cylinder 202 cannot flow downwardly through the fluid conduit 36 because, as previously explained, its path is blocked internally of the synchronizing valve 10. Accordingly, only the rod 208 retracts until the cock sensing means 18 senses restoration of equilibrium and brings the spool 16 back to its middle position.

STRUCTURE AND OPERATION OF THE COCK SENSING MEANS

Figure 3:
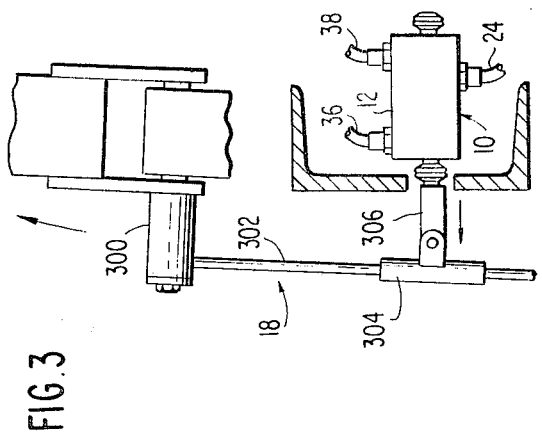
FIG. 3 is a fragmentary front view on an enlarged scale of the left-hand portion of FIG. 2.
Figure 2:
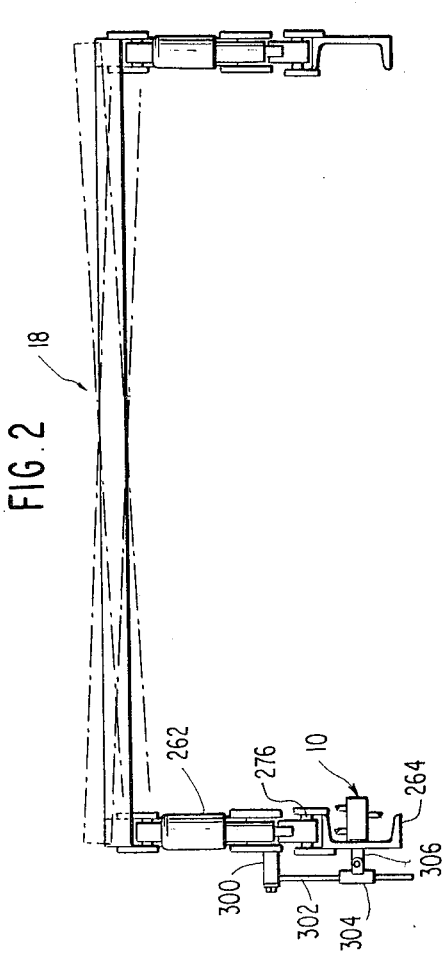
FIG. 2 is a fragmentary front view of a portion of the cab frame, a portion of the truck frame, and the cock sensing means.

The cock sensing means 18 is shown in FIGS. 1 through 3 positioned between the cab frame 268 and the truck frame 264. The cock sensing means 18 is connected to the cab frame 268 via a bearing housing 300 which is mounted transversely on the cab frame 264. A sensing rod 302 attached to the bearing housing 300 is slidably received in a bearing 304. The bearing 304 in turn is mounted on a linkage rod 306 via a pivot 308 (shown in FIG. 4) in the plane of the paper in FIGS. 2 and 3, which permits the bearing 304 to pivot in the plane of the paper in FIG. 1 when the cab frame 268 is pivoted relative to the truck frame 264.

The pivot 308 comprises an internal annular ring 310 carried by a shaft 312 and received in an external annular bearing relief 314 on a stub shaft 316. The shaft 312 is threaded at 318 for connection to the linkage rod 306. The stub shaft 316 is mounted on the plug 100 by any appropriate means (for instance, welding). An extensible and flexible sleeve 320 is snap fitted at one end into an annular relief 322 in an extension 324 on the housing 12 and snap fitted at the other end into an annular relief 326 in the shaft 312 to prevent contamination of the pivot 308. A hole 328 is provided in the shaft 312 and a corresponding hole (not shown) is provided in the sleeve 320 to permit the shaft 320 to be turned relative to the linkage rod 306 by an appropriate tool.

If the hydraulic cylinders 200 and 202 extend or retract perfectly uniformly, the sensing rod 302 slides freely in the bearing 304, the bearing 304 pivots freely in the plane of FIG. 1, the cock sensing means 18 senses no cocking, and the synchronizing valve 10 remains in the position shown in FIG. 5. If, however, the cab frame 268 cocks slightly due to the uneven extension or retraction of the hydraulic cylinders 200 and 202, as indicated in FIG. 2 by the broken lines, the bearing housing 300 is tilted from its level position, the sensing rod 302 is tilted out of the plane of FIG. 1, and the bearing 304 is pivoted about pivot 308 (shown in FIGS. 2 and 3), which connects the bearing 304 to the linkage rod 306. At the same time, the linkage rod 306 moves transversely, and, since the linkage rod 306 is connected to the spool 16 as shown in FIG. 4, this in turn causes the spool 16 to slide within the bore 14. For instance, if the cab frame 268 cocks to the right, as indicated by the upper arrow in FIG. 3, the linkage rod 306 and the spool 16 are moved to the left, as indicated by the lower arrow in FIG. 3.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

I claim:

1. A motor vehicle comprising:
   (a) a chassis member;
   (b) a cab member mounted on said chassis member for pivotal movement about an axis transverse to the longitudinal axis of said chassis member from a lowered first position to a raised second position;
   (c) two transversely spaced tilt cylinders operatively connected to said chassis member and to said cab member to pivot said cab member back and forth between its first and second position;
   (d) a first member connected to said cab;
   (e) a second member connected to said chassis;
   (f) first means operatively connecting said first member to said second member in a manner to sense a cocking of said cab member due to one of said tilt cylinders having extended or retracted more rapidly than the other during raising or lowering of said cab member and for generating a signal indicative thereof; and
   (g) second means for reducing the flow of hydraulic fluid to said one of said tilt cylinders in response to said signal, characterized in that
      (1) said first member is a sensing rod mounted on said cab member for pivotal movement therewith;
      (2) said second member is a linkage rod; and
      (3) said first means detects any motion of said linkage rod in one direction from a central neutral position to cause said second means to reduce the flow of hydraulic fluid to one of said tilt cylinders and motion of said linkage rod in the other direction from its central neutral position causes said second means to reduce the flow of hydraulic fluid to the other of said tilt cylinders, and wherein said first means comprises a bearing:
         (i) which slidably receives said sensing rod and
         (ii) which is pivotably mounted on said linkage rod such that, if said tilt cylinders extend or retract in unison, said sensing rod slides freely in said bearing, said bearing pivots freely on said linkage rod, and said linkage rod does not move from its central neutral position, but, if one of said tilt cylinders extends or retracts more rapidly than the other, causing said sensing rod to cock, in turn causing said bearing to cock and to translate, said linkage rod does move from its central neutral position, causing said second means to reduce the flow of hydraulic fluid to one of said tilt cylinders.

2. A motor vehicle as recited in claim 1 wherein:
   (a) said second means comprises a spool slidably received in a housing and
   (b) said linkage rod is operatively connected to said spool such that said linkage rod can rotate freely relative to said spool but translational movement of said linkage rod causes said spool to slide in said housing.

3. A motor vehicle as recited in claim 1 wherein said second means comprises:
   (a) a housing;
   (b) a spool slidably received in a spool bore in said housing for translational movement in either direction from a central neutral position;
   (c) inlet means in said housing for hydraulic fluid from a source of hydraulic fluid under pressure;
   (d) first and second outlet means in said housing for hydraulic fluid;
   (e) a first path of fluid communication from said inlet means, through said housing, said spool, and said housing again to said first and second outlet means when said spool is in its central neutral position;
   (f) a second path of fluid communication from said inlet means, through said housing, said spool, and said housing again to said first outlet means when said spool is translated from its central neutral position in one direction; and
   (g) a third path of fluid communication from said inlet means, through said housing, said spool, and said housing again to said second outlet means when said spool is translated from its central neutral position in the other direction.

4. A motor vehicle as recited in claim 3 wherein:
   (a) said housing contains first, second, and third longitudinal bores;
   (b) said inlet means is in fluid communication with said first longitudinal bore;
   (c) said first longitudinal bore is in fluid communication with said spool bore at four longitudinally spaced locations;
   (d) said first outlet means is in fluid communication with said second longitudinal bore;
   (e) said second longitudinal bore is in fluid communication with said spool bore at two longitudinally spaced locations;
   (f) said second outlet means is in fluid communication with said third longitudinal bore;
   (g) said third longitudinal bore is in fluid communication with said spool bore at two longitudinally spaced locations;
   (h) said spool contains fourth and fifth longitudinal bores each of which contains a one-way valve;
   (i) said fourth longitudinal bore is in fluid communication with the exterior of said spool at two longitudinally spaced locations; and
   (j) said fifth longitudinal bore is in fluid communication with the exterior of said spool at two longitudinally spaced locations.

5. In a motor vehicle comprising:
   (a) a chassis member;
   (b) a cab member mounted on said chassis member for pivotal movement about an axis transverse to the longitudinal axis of said chassis member from a lowered first position to a raised second position;

(c) two transversely spaced tilt cylinders operatively connected to said chassis member and to said cab member to pivot said cab member back and forth between its first and second positions;

(d) a linkage between said cab and said chassis for sensing a cocking of said cab member due to one of said tilt cylinders having extended or retracted more rapidly than the other during raising or lowering of said cab members and for generating a signal indicative thereof; and (e) means for reducing the flow of hydraulic fluid to said one of said tilt cylinders in response to said signal, the improvement wherein said linkage comprises:

(1) a sensing rod mounted on said cab member for pivotal movement therewith;

(2) a linkage rod operatively connected to said means such that motion of said linkage rod in one direction from a central neutral position causes said means to reduce the flow of hydraulic fluid to one of said tilt cylinders and motion of said linkage rod in the other direction from its central neutral position causes said means to reduce the flow of hydraulic fluid to the other of said tilt cylinders; and (3) a bearing
  (i) which slidably receives said sensing rod and
  (ii) which is pivotally mounted on said linkage rod such that, if said tilt cylinders extend or retract in unison, said sensing rod slides freely in said bearing, said bearing pivots freely on said linkage rod, and said linkage rod does not move from its central neutral position, but, if one of said tilt cylinders extends or retracts more rapidly than the other, causing said sensing rod to cock, in turn causing said bearing to cock and to translate, said linkage rod does move from its central position, causing said means to reduce the flow of hydraulic fluid to said one of said tilt cylinders.

6. In a motor vehicle as recited in claim 5, the further improvement wherein:

(a) said means comprises a spool slidably received in a housing and (b) said linkage rod is operative connected to said spool such that said linkage rod can rotate freely relative to said spool but translational movement of said linkage rod causes said spool to slide in said housing.

7. In a motor vehicle as recited in claim 5, the further improvement wherein said second means comprises:

(a) a housing;

(b) a spool slidably received in a spool bore in said housing for translational movement in either direction from a central neutral position;

(c) inlet means in said housing for hydraulic fluid from a source of hydraulic fluid under pressure;

(d) first and second outlet means in said housing for hydraulic fluid;

(e) a first path of fluid communication from said inlet means, through said housing, said spool, and said housing again to said first and second outlet means when said spool is in its central neutral position;

(f) a second path of fluid communication from said inlet means, through said housing, said spool, and said housing again to said first outlet means when said spool is translated from its central neutral position in one direction; and (g) a third path of fluid communication from said inlet means, through said housing, said spool, and said housing again to said second outlet means when said spool is translated from its central neutral position in the other direction.

8. In a motor vehicle as recited in claim 7, the further improvement wherein:

(a) said housing contains first, second, and third longitudinal bores;

(b) said inlet means is in fluid communication with said first longitudinal bore;

(c) said first longitudinal bore is in fluid communication with said spool bore at four longitudinally spaced locations;

(d) said first outlet means is in fluid communication with said second longitudinal bore;

(e) said second longitudinal bore is in fluid communication with said spool bore at two longitudinally spaced locations;

(f) said second outlet means is in fluid communication with said third longitudinal bore;

(g) said third longitudinal bore is in fluid communication with said spool bore at two longitudinally spaced locations;

(h) said spool contains fourth and fifth longitudinal bores each of which contains a one-way valve;

(i) said fourth longitudinal bore is in fluid communication with the exterior of said spool at two longitudinally spaced locations; and (j) said fifth longitudinal bore is in fluid communication with the exterior of said spool at two longitudinally spaced locations.

* * * * *